United States Patent [19]

Lay et al.

[11] 4,013,372
[45] Mar. 22, 1977

[54] TUBING CONNECTION
[75] Inventors: Ralph B. Lay; Donald L. Moore, both of Columbus, Ind.
[73] Assignee: Cosco, Inc., Columbus, Ind.
[22] Filed: June 18, 1975
[21] Appl. No.: 587,809
[52] U.S. Cl. .............................. 403/237; 403/258; 403/297
[51] Int. Cl.² .......................................... F16B 12/40
[58] Field of Search .......... 403/234, 258, 260, 231, 403/230, 297, 237, 295, 403, 205, 298

[56] References Cited
UNITED STATES PATENTS

| 2,557,766 | 6/1951 | Ronfeldt | 403/237 |
| 2,647,000 | 7/1953 | Colley | 403/237 |
| 2,868,602 | 1/1959 | Drezner | 403/298 |
| 2,972,395 | 2/1961 | Peremi | 403/231 |

FOREIGN PATENTS OR APPLICATIONS

| 563,853 | 1/1958 | Belgium | 403/258 |
| 716,251 | 8/1965 | Canada | 403/403 |

Primary Examiner—Andrew V. Kundrat
Attorney, Agent, or Firm—Jenkins, Hanley & Coffey

[57] ABSTRACT

A tubing connection for an article of furniture in which a tubular leg is perpendicularly connected to the external surface of a tubular support member. An elastomeric insert is press-fit into the open end of the leg, and is retained therein by tabs on said leg. A screw is received through the support member and threaded into the insert to bindingly retain said leg and support member together.

9 Claims, 4 Drawing Figures

TUBING CONNECTION

SUMMARY OF THE INVENTION

In accordance with one form of the invention, as it is embodied in a supporting frame for a table, there is provided a plurality of upstanding tubular legs each having its upper and lower ends connected at right angles to upper and lower tubular rings. To form the connections, each end of each leg is recessed to have an arcuate cross section for mating engagement with the external surface of one of the tubular rings. A cylindrical elastomeric insert is press-fit into each end of each leg and is retained therein by tabs extending inwardly from the leg outer diameter at the end thereof. Screws extend through the rings and are each threadably received into an insert within one of the legs to bring the recessed end of each leg into binding engagement with one of the rings to form the supporting frame.

BRIEF DESCRIPTION OF THE DRAWINGS

The accompanying drawings illustrate the invention. In such drawings.

DETAILED DESCRIPTION OF THE PREFERRED EMBODIMENT

Figure 1:
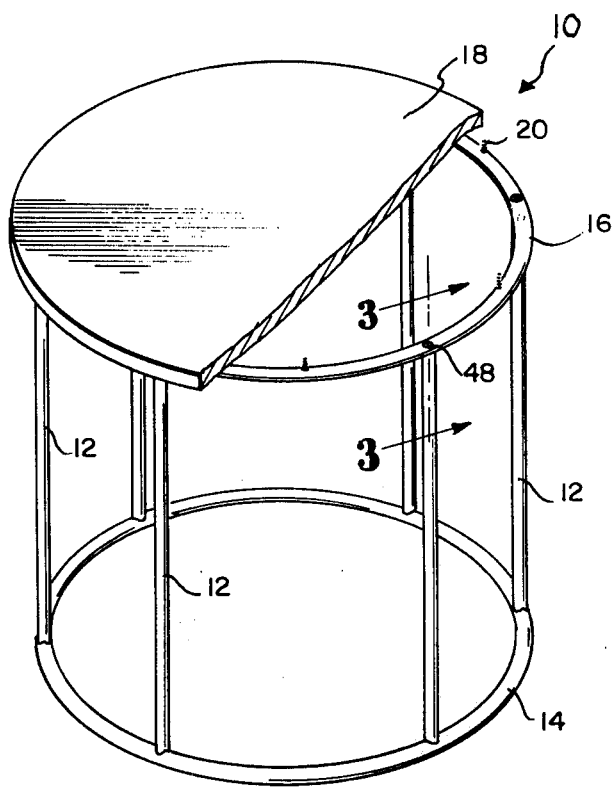
FIG. 1 is a perspective view of a table with tubing connections embodying this invention, and having portions thereof broken away.

A table 10 having a tubular supporting frame with tubing connections embodying the invention is shown in FIG. 1. The table generally comprises a plurality of upstanding tubular legs 12 each connected at their lower ends to a tubular base ring 14 which engages the floor. The upper end of each leg 12 is connected to a tubular support ring 16 which provides a supporting surface for a table top 18 or the like. Said top is connected to the upper support ring 16 by screws 20 received upwardly through the ring 16 and fastened into the underside of the top 18.

Figure 2:
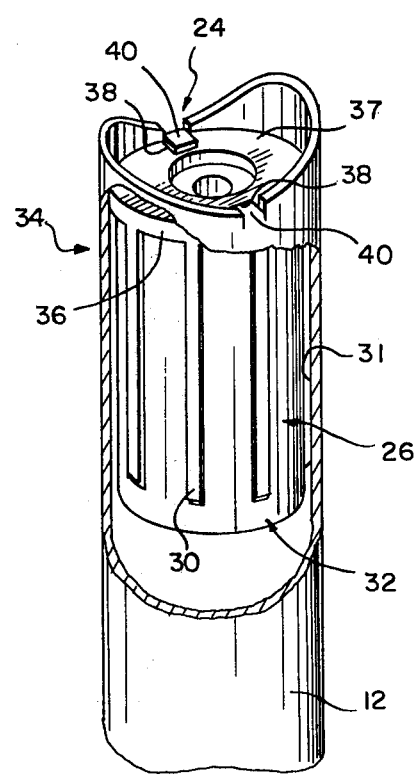
FIG. 2 is an enlarged perspective view of one end of one of the tubing legs of FIG. 1, with portions thereof broken away.
Figure 3:
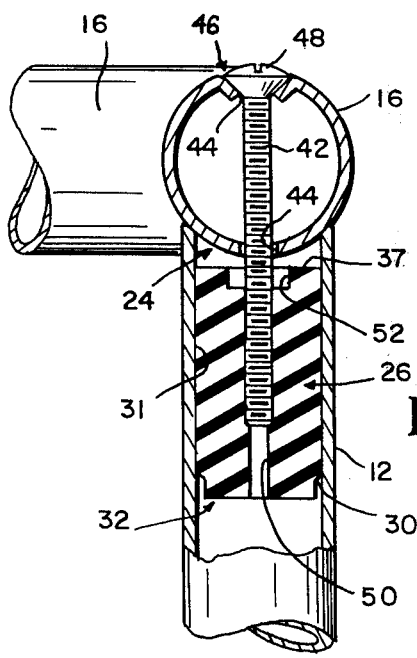
FIG. 3 is an enlarged, fragmentary vertical section taken on the line 3—3 of FIG. 1.

Each end of each leg is identical, and is connected to the lower base ring 14, or to the upper support ring 16, in a similar manner. Accordingly, one end of one of the legs 12 and its connection to the support ring 16 is shown by way of example in FIGS. 2 and 3. As shown, the end of the leg 12 is recessed, or notched, to have an arcuate cross section 24 shaped for matingly abutting the rounded external surface of the support ring 16. Thus, when the leg end engages the ring 16, the leg seats firmly on the ring and is prevented by its own shape from rotating about its axis.

A generally cylindrical insert 26 of a semi-rigid elastomeric material is press-fit into each open end of each leg 12. As shown, each insert comprises a plug of a circular cross section with a series of longitudinally extending ribs 30 which give the insert an effective diameter slightly greater than the inside diameter of the leg 12. The ribs yield slightly upon press-fitting of the insert into the leg, and then scrub the inner wall 31 of the leg to tightly maintain the insert in position. Conveniently, the ribs terminate short of the front end 32 of the insert to provide a reduced diameter at the front end for easy starting into the leg. Further, at the rear end 34 of the insert, the ribs combine to form a continuous collar 36 for tightly scrubbing the leg inner wall 31 to help retain the insert in position.

The rear face 37 of the insert 26 has a pair of rearwardly and outwardly open slots 38 formed in opposed relation therein. The slots 38 receive opposed tabs 40 which are turned inwardly from the end of the leg 12 at the outer diameter thereof after the insert is pressed therein. Said tabs are formed at the deepest portions of the arcuate recess 24, and are spaced away from the recess. The tabs 40 thereby prevent the insert from being pulled out of the leg, and space the rear face 37 of the insert from contact with the support ring 16 when said leg is in mating engagement therewith.

Each leg 12 is connected to the support ring 16 by a screw 42. The ring 16 has a pair of aligned holes 44 formed therein for receiving the screw normal to the ring central axis, and conveniently, is countersunk, as at 46, on the side opposite the leg 12 for receiving the head 48 of the screw substantially flush with the outer ring surface. The screw extends through the ring 16 and is threadably received into a longitudinally extending central opening 50 in the insert 26 within the leg. As shown, said opening 50 has an enlarged diameter portion 52 adjacent the rear face 37 of the insert for ready reception of the screw 42. Said screw is conveniently a self-threading screw, and serves to bring the arcuately recessed end of the leg 12 into mating and binding engagement with the rounded exterior of the support ring 16. Because the tabs 40 keep the insert spaced from the ring 16, the interconnection is under pressure at all times and is thereby both sturdy and relatively wobble-free with the tabs substantially hidden from view. Alternately, the screw 42 can be a conventional machine screw provided the insert central opening 50 is internally threaded.

Figure 4:
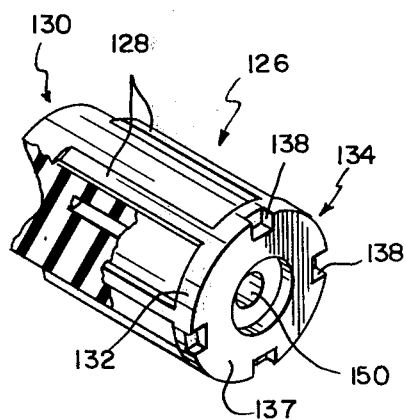
FIG. 4 is an enlarged perspective view of an alternate insert for the tubing legs, with portions thereof broken away.

A modified insert 126 for reception into the open ends of the tubing legs 12 is shown in FIG. 4. As shown, the modified insert 126 is cylindrical in shape, and has longitudinally extending ribs 128 spaced about the periphery thereof. These ribs, as with the previous embodiment, stop short of the forward end 130 of the insert to permit ready insertion of the insert into a leg, and blend into a collar 132 at the rear end 134. The ribs and collar again serve to scrub the inner wall of the leg to tightly retain the insert in position. The rear face 137 of the insert has a plurality of opposed slots 138 formed therein at right angles to each other for reception of the pair of tabs 40. During assembly of the frame, when each screw 42 is threaded into the central opening 150 of an insert, the insert is drawn over the screw 42 and turned within the leg until the tabs 40 are received in a pair of the slots 138. Further, as shown in FIG. 4, the central opening 150 of the insert does not extend entirely through the insert, but instead stops short of the insert forward end 130. Thus, when a self-threading screw 42 is threaded into the insert, the screw expands the forward end 130 of the insert to thereby form an even tighter connection between the leg 12 and the ring 14 or 16 connected thereto.

We claim:

1. A tubing connection for an article of furniture comprising a first tube having an open end and a second tube, the open end of said first tube being arcuately recessed for mating engagement with the external surface of said second tube; a cylindrical insert for reception into the open end of said first tube and having a longitudinally extending central opening formed therein; a pair of opposed tabs on said first tube extending inwardly from the deepest portions of the arcuate recess at the open end thereof for retaining said insert within said first tube and for spacing said insert from the end of said first tube; and screw means receivable through an opening formed in said second tube and threadably receivable into the central opening of said insert to bindingly interconnect said first and second tubes.

2. A tubing connection as set forth in claim 1 wherein said insert is formed from an elastomeric material for press-fitting into the open end of said first tube.

3. A tubing connection as set forth in claim 2 wherein said insert has a plurality of longitudinally extending external ribs for tightly engaging the inner wall of said first tube when said insert is press-fit therein.

4. A tubing connection as set forth in claim 1 wherein the face of said insert presented toward said tabs when said insert is received within said first tube has a pair of opposed slots formed therein for receiving said tabs to prevent turning of the insert within said first tube.

5. A tubing connection for an article of furniture comprising a first tube having an open end; a cylindrical insert for reception into the open end of said first tube and having a longitudinally extending central opening formed therein; a plurality of tabs extending inwardly from the outer diameter at the open end of said first tube for retaining said insert therein and for spacing said insert from the open end thereof, said insert having a plurality of slots formed in the face thereof presented toward said plurality of tabs when said insert is received in said first tube for receiving said tabs to prevent turning of the insert within said first tube; a second tube; and screw means receivable through an opening formed in said second tube and threadably receivable into the central opening of said insert to bindingly interconnect said first and second tubes.

6. A tubing connection as set forth in claim 5 wherein said second tube has a generally circular cross section, and the open end of said first tube is arcuately recessed for mating engagement with the external surface of said second tube.

7. A tubing connection as set forth in claim 6 wherein said plurality of tabs comprises a pair of opposed tabs extending inwardly from the deepest portions of the arcuate recess formed on said first tube, and said plurality of slots formed in said insert comprise a pair of opposed slots for receiving said tabs.

8. A tubing connection as set forth in claim 5 wherein said insert is formed from an elastomeric material for press-fitting into the open end of said first tube.

9. A tubing connection as set forth in claim 8 wherein said insert has a plurality of longitudinally extending external ribs for tightly engaging the inner wall of said first tube when said insert is press-fit therein.

* * * * *